(12) United States Patent
Baek

(10) Patent No.: US 12,012,098 B2
(45) Date of Patent: Jun. 18, 2024

(54) APPARATUS FOR CONTROLLING LANE KEEPING, SYSTEM HAVING THE SAME AND METHOD THEREOF

(71) Applicants: Hyundai Motor Company, Seoul (KR); Kia Corporation, Seoul (KR)

(72) Inventor: Un Tae Baek, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 98 days.

(21) Appl. No.: 17/496,891

(22) Filed: Oct. 8, 2021

(65) Prior Publication Data

US 2022/0289183 A1 Sep. 15, 2022

(30) Foreign Application Priority Data

Mar. 12, 2021 (KR) ........................ 10-2021-0032845

(51) Int. Cl.
*B60W 30/12* (2020.01)

(52) U.S. Cl.
CPC ....... *B60W 30/12* (2013.01); *B60W 2510/205* (2013.01); *B60W 2520/06* (2013.01); *B60W 2552/30* (2020.02); *B60W 2710/06* (2013.01); *B60W 2710/18* (2013.01); *B60W 2710/20* (2013.01); *B60W 2720/24* (2013.01)

(58) Field of Classification Search
CPC .......... B60W 30/12; B60W 2510/205; B60W 2520/06; B60W 2552/30; B60W 2710/06; B60W 2710/18; B60W 2710/20; B60W 2720/24; B60W 2050/0022; B60W 2050/0049; B60W 2530/18; B60W 2520/14; B60W 40/072; B60W 2050/0005; B60W 2540/18; B60Y 2300/12

See application file for complete search history.

(56) References Cited

U.S. PATENT DOCUMENTS

| | | | |
|---|---|---|---|
| 6,185,492 B1* | 2/2001 | Kagawa | B62D 15/025 701/28 |
| 9,731,755 B1* | 8/2017 | Moshchuk | B62D 6/00 |
| 11,318,936 B2* | 5/2022 | Giorelli | G05D 1/0212 |
| 2006/0217861 A1* | 9/2006 | Ihara | B62D 15/029 701/41 |
| 2009/0005933 A1* | 1/2009 | Tabata | B60T 8/17557 701/41 |
| 2013/0060414 A1* | 3/2013 | Lee | B62D 1/286 701/23 |
| 2013/0317698 A1* | 11/2013 | Yoon | B62D 15/025 701/41 |
| 2015/0274163 A1* | 10/2015 | Terazawa | B60W 10/20 701/41 |
| 2017/0313304 A1* | 11/2017 | Shiraishi | B60W 30/04 |

(Continued)

FOREIGN PATENT DOCUMENTS

KR 10-1658089 B1 9/2016

*Primary Examiner* — Sze-Hon Kong
(74) *Attorney, Agent, or Firm* — Fox Rothschild LLP

(57) ABSTRACT

A lane keeping control apparatus, a vehicle system including the same includes a processor that is configured to calculate a target lateral movement distance based on lane information during lane keeping control. The processor corrects the target lateral movement distance by correcting a heading angle of a vehicle and an offset from a target path before the vehicle reaches the target path and a storage stores data and algorithms driven by the processor.

18 Claims, 6 Drawing Sheets

(56) References Cited

U.S. PATENT DOCUMENTS

| | | | | |
|---|---|---|---|---|
| 2018/0086340 | A1* | 3/2018 | Nagatsuka | B62D 15/025 |
| 2019/0009779 | A1* | 1/2019 | Kim | B62D 6/10 |
| 2020/0023884 | A1* | 1/2020 | Mizoo | B60W 30/16 |
| 2020/0160069 | A1* | 5/2020 | Sathyanarayana | G06V 20/588 |
| 2020/0239071 | A1* | 7/2020 | Lenneman | B62D 15/029 |
| 2020/0276971 | A1* | 9/2020 | Takeda | B60N 2/10 |
| 2020/0307612 | A1* | 10/2020 | Nakamura | B60W 40/072 |
| 2020/0341476 | A1* | 10/2020 | Wuthishuwong | B60W 30/09 |
| 2020/0398894 | A1* | 12/2020 | Hudecek | G05D 1/0214 |
| 2021/0179093 | A1* | 6/2021 | Miyamoto | B60W 30/12 |
| 2021/0248391 | A1* | 8/2021 | Kizumi | G06F 18/22 |
| 2021/0253166 | A1* | 8/2021 | Tomoi | B62D 15/025 |
| 2021/0373566 | A1* | 12/2021 | Agarwal | B62D 15/025 |
| 2022/0009547 | A1* | 1/2022 | Osajima | B62D 5/0463 |
| 2022/0017141 | A1* | 1/2022 | Maruyama | B62D 5/0484 |
| 2022/0194371 | A1* | 6/2022 | Kvieska | B60W 30/02 |
| 2022/0266852 | A1* | 8/2022 | Khayyer | H04W 4/029 |
| 2023/0068573 | A1* | 3/2023 | Tominaga | B60W 30/12 |

* cited by examiner

APPARATUS FOR CONTROLLING LANE KEEPING, SYSTEM HAVING THE SAME AND METHOD THEREOF

CROSS-REFERENCE TO RELATED APPLICATION

This application claims priority to and benefits of Korean Patent Application No. 10-2021-0032845, filed on Mar. 12, 2021, the entire contents of which are incorporated herein by reference.

BACKGROUND

(a) Field of the Disclosure

The present disclosure relates to a lane keeping control apparatus, a vehicle system including the same, and a method thereof, and more particularly, to a technique for improving stability of following a center of a vehicle.

(b) Description of the Related Art

Various systems for safe driving are applied to vehicles produced recently, or development for such application is underway, and one of them is a lane keeping control system that performs driving control to maintain a lane by preventing lane departure when a vehicle leaves a lane due to driver's careless driving. This lane keeping control system creates a target path at a center of a lane and operates a vehicle to follow the target path, and a steering wheel alignment command is executed after the vehicle reaches the target path.

In other words, the conventional lane keeping control system calculates and follows a target lateral movement distance based on lane information received from a camera sensor. However, when a vehicle with a low vehicle steering response or a large load, a steering wheel is not aligned in advance before the vehicle reaches a target lateral movement position, resulting in control overshoot and vehicle oscillation.

The above information disclosed in this section is merely for enhancement of understanding of the background of the disclosure, and therefore, it may contain information that does not form the prior art that is already known in this country to a person of ordinary skill in the art.

SUMMARY

The present disclosure has been made in an effort to provide a lane keeping control apparatus, a vehicle system including the same, and a method thereof, capable of improving stability of a lane center following performance by assigning weights to a heading angle and an offset item such that a steer wheel is aligned in advance before reaching a target lateral movement position.

The technical objects of the present disclosure are not limited to the objects mentioned above, and other technical objects not mentioned may be clearly understood by those skilled in the art from the description of the claims.

An exemplary embodiment of the present disclosure provides a lane keeping control apparatus that may include: a processor configured to calculate a target lateral movement distance based on lane information during lane keeping control, and to correct the target lateral movement distance by correcting a heading angle of a vehicle and an offset from a target path before the vehicle reaches the target path; and a storage configured to store data and algorithms driven by the processor.

In an exemplary embodiment, the processor may be configured to calculate the target lateral movement distance based on a moving distance of the vehicle by the heading angle of the vehicle, a moving distance of the vehicle by the offset from the target path of the vehicle, and a moving distance of the vehicle by a curvature of a driving road. In an exemplary embodiment, the processor may be configured to assign a weight for increasing the heading angle of the vehicle and a weight for reducing the offset from the target path.

The processor may be configured to correct the target lateral movement distance when a steering angular velocity is less than a predetermined angular velocity threshold value and a curvature of a driving road is less than a predetermined curvature threshold value. In addition, the processor may be configured to correct the target lateral movement distance when the offset from the target path is less than a first predetermined threshold and greater than a second predetermined threshold that is smaller than the first threshold.

In an exemplary embodiment, the processor may be configured to assign different weights to the heading angle of the vehicle and the offset from the target path when the offset from the target path is less than a first predetermined threshold and greater than a second predetermined threshold that is less than the first threshold. The processor may be configured to first reflect steering wheel alignment by adjusting the weight given to the heading angle of the vehicle to increase; and may reduce the weight assigned to the offset from the target path. In addition, the processor may be configured to assign no weight to the heading angle of the vehicle and the offset from the target path when the offset from the target path is equal to or greater than a first predetermined threshold and equal to or less than a second predetermined threshold.

An exemplary embodiment of the present disclosure provides a vehicle system that may include: a sensing device configured to acquire lane information related to a front of a vehicle; and a lane keeping control apparatus configured to calculate a target lateral movement distance based on the lane information during lane keeping control, and to correct the target lateral movement distance by correcting a heading angle of a vehicle and an offset from a target path before the vehicle reaches the target path.

In particular, the lane keeping control apparatus may be configured to calculate the target lateral movement distance based on a moving distance of the vehicle by the heading angle of the vehicle, a moving distance of the vehicle by the offset from the target path of the vehicle, and a moving distance of the vehicle by a curvature of a driving road. The lane keeping control apparatus may be configured to assign a weight for increasing the heading angle of the vehicle and a weight for reducing the offset from the target path.

In an exemplary embodiment, the lane keeping control apparatus may be configured to correct the target lateral movement distance when a steering angular velocity is less than a predetermined angular velocity threshold value and a curvature of a driving road is less than a predetermined curvature threshold value. In addition, the lane keeping control apparatus may be configured to correct the target lateral movement distance when the offset from the target path is less than a first predetermined threshold and greater than a second predetermined threshold that is less than the first threshold. In particular, the lane keeping control apparatus may be configured to assign different weights to the heading angle of the vehicle and the offset from the target path when the offset from the target path is less than a first predetermined threshold and greater than a second predetermined threshold that is less than the first threshold.

An exemplary embodiment of the present disclosure provides a lane keeping control method that may include obtaining lane information during lane keeping control; and calculating a target lateral movement distance based on lane information, and correcting the target lateral movement distance by correcting a heading angle of a vehicle and an offset from a target path before the vehicle reaches the target path. In an exemplary embodiment, the correcting of the target lateral movement distance may include calculating the target lateral movement distance based on a moving distance of the vehicle by the heading angle of the vehicle, a moving distance of the vehicle by the offset from the target path of the vehicle, and a moving distance of the vehicle by a curvature of a driving road.

In addition, the correcting of the target lateral movement distance may include assigning a weight for increasing the heading angle of the vehicle and a weight for reducing the offset from the target path. The correcting of the target lateral movement distance may also include correcting the target lateral movement distance when a steering angular velocity is smaller than a predetermined angular velocity threshold value and a curvature of a driving road is smaller than a predetermined curvature threshold value.

In an exemplary embodiment, the correcting of the target lateral movement distance may include assigning different weights to the heading angle of the vehicle and the offset from the target path when the offset from the target path is less than a first predetermined threshold and greater than a second predetermined threshold that is less than the first threshold; and assigning no weight to the heading angle of the vehicle and the offset from the target path when the offset from the target path is equal to or greater than a first predetermined threshold and equal to or less than a second predetermined threshold. The correcting of the target lateral movement distance may further include first reflecting steering wheel alignment by adjusting the weight given to the heading angle of the vehicle to increase; and reducing the weight assigned to the offset from the target path.

According to the present technique, it may be possible to improve stability of a lane center following performance by assigning weights to a heading angle and an offset item such that a steer wheel is aligned in advance before reaching a target lateral movement position. In addition, various effects that may be directly or indirectly identified through this document may be provided.

DETAILED DESCRIPTION

Figure 1:
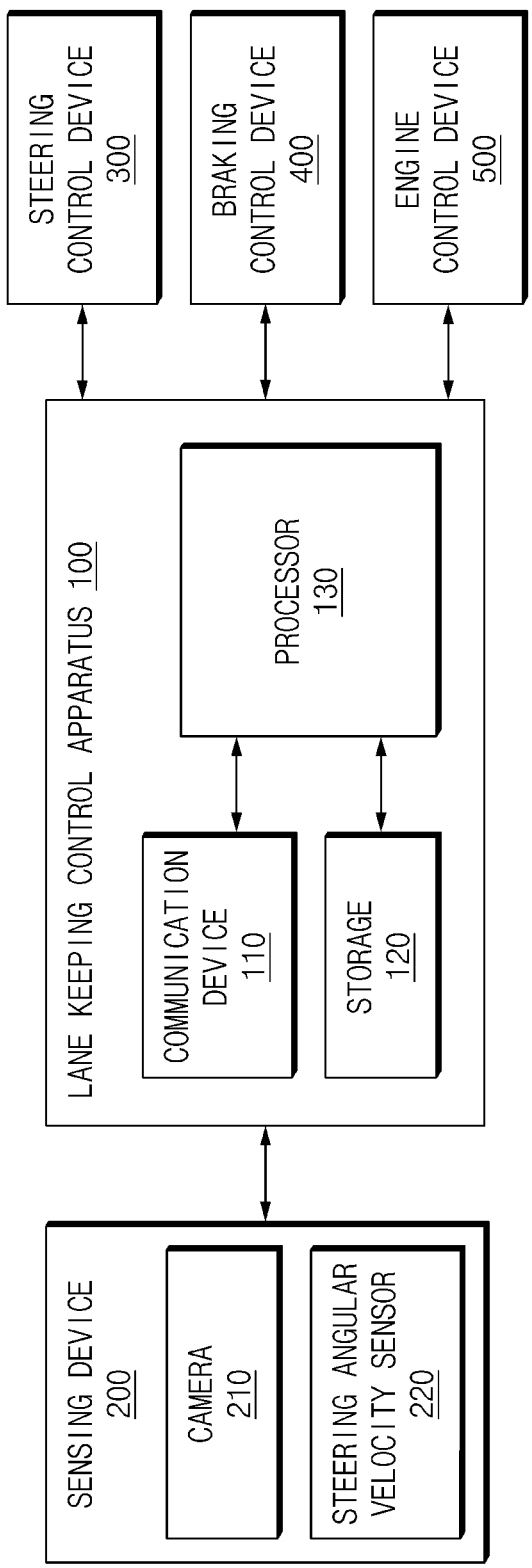
FIG. 1 illustrates a block diagram showing a configuration of a vehicle system including a lane keeping control apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present disclosure discloses a technique capable of improving stability of a lane center following performance by assigning weights to a heading angle and an offset item such that a steer wheel is aligned in advance before reaching a target lateral movement position. Specifically, the present disclosure improves vehicle responsiveness and path following performance by applying weights for a heading angle and offset items such that steering wheel is aligned in advance (opposite sign in the direction of progression) can be done in advance.

Hereinafter, exemplary embodiments of the present disclosure will be described in detail with reference to FIG. 1 to FIG. 6. FIG. 1 illustrates a block diagram showing a configuration of a vehicle system including a lane keeping control apparatus according to an exemplary embodiment of the present disclosure.

Referring to FIG. 1, the vehicle system according to the exemplary embodiment of the present disclosure may include a lane keeping control apparatus 100, a sensing device 200, a steering control device 300, a braking control device 400, and an engine control device 500.

The lane keeping control apparatus 100 according to the exemplary embodiment of the present disclosure may be implemented inside the vehicle. In particular, the lane keeping control apparatus 100 may be integrally formed with internal control units of the vehicle, or may be implemented as a separate device to be connected to control units of the vehicle by a separate connection means. The lane keeping control apparatus 100 may be implemented as a lane following assist (LFA), a lane departure warning (LDW), a lane keeping system (LKS), and a lane keeping assistance device system (LKAS), etc.

The lane keeping control apparatus 100 may be configured to calculate a target lateral movement distance based on lane information during lane keeping control, and correct the target lateral movement distance by correcting a heading angle of a vehicle and an offset (center offset) from a target path among lane information before the vehicle reaches the target path. The lane keeping control apparatus 100 may be configured to receive sensing information from the sensing device 200 such as a camera 210, and determine a basic entry condition and a center offset condition for applying a weight for each path component.

Particularly, the basic entry condition for applying the weight value for each path component is for determining whether to enter a weight value application mode for each path component, and may include a steering angular velocity of the vehicle and curvature of a driving road. In other words, when the steering angle speed of the vehicle and the curvature of the driving road are within a predetermined range, the lane keeping control apparatus 100 may be configured to determine that a weight for each path component may be assigned when a lane keeping auxiliary function is operated.

The lane keeping control apparatus 100 may be configured to align the steering wheel just before the vehicle reaches the target path (e.g., the center of the lane) during the lane center following control, and output weights for each path when the center offset (offset from the lane center) of the vehicle is in a weak section where steering wheel alignment is not pre-reflected. Accordingly, the lane keeping control apparatus 100 may be configured to apply an increasing weight to the heading angle, which is an item that improves the responsiveness of a vehicle behavior for steering wheel alignment, and apply a decreasing weight to the offset (center offset), which is an item that interferes with the steer wheel alignment.

The lane keeping control apparatus 100 may be configured to perform calculation by applying a weight for a damping effect to the heading angle and the offset item to an existing target lateral movement distance based on a lane coefficient calculated based on the information of the camera 210. Referring to FIG. 1, the lane keeping control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 110 may be configured to communicate with in-vehicle devices, and may receive a sensing result from the sensing device 200. Particularly, the communication device 110 may be configured to receive a distance error from a camera 210 to a center of a vehicle on a gazing distance.

The storage 120 may be configured to store sensing results of the sensing device 200 and data and/or algorithms required for the processor 130 to operate, and the like. As an example, the storage 120 may be configured to store lane information received from the sensing device 200, and store a target lateral movement distance, a weight, etc. calculated by the processor 130. The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, thereby performing various data processing and calculations described below. The processor 130 may be configured to process signals transferred between constituent elements of the lane keeping control apparatus 100. The processor 130 may be, e.g., an electronic control unit (ECU), a micro controller unit (MCU), or other subcontrollers mounted in the vehicle.

The processor 130 may be configured to determine a condition for assigning a weight value for each path component. In other words, the processor 130 may be configured to determine whether to assign a weight for each path component based on the steering angular velocity of the vehicle and the curvature of the driving road. Particularly, the weight for each path component may include a heading weight value $W_1$ and an offset weight value $W_0$. For example, the processor 130 may be configured to assign a weight when there is no sudden change in the steering angular velocity of the vehicle. On the other hand, the processor 130 may not assign a weight for each path component during over-steering such as driver override. In other words, the weight $W_1=1$ and the weight $W_0=1$.

The processor 130 may assign the weights $W_1$ and $W_0$ when the steering angular velocity $$\left|\frac{d\theta}{dt}\right|$$

is less than an angular velocity threshold $$\frac{d\theta}{dt}_{safety}$$

as shown in Equation 1.

$$\left|\frac{d\theta}{dt}\right| < \frac{d\theta}{dt}_{safety} \quad \text{Equation 1}$$

In addition, the processor 130 may be configured to assign the weights $W_1$ and $W_0$ when the curvature $$\left|\frac{1}{R}\right|$$

of the road is less than the angular velocity threshold $$\frac{1}{R_{safety}}$$

as shown in Equation 2.

$$\left|\frac{1}{R}\right| < \frac{1}{R_{safety}} \quad \text{Equation 2}$$

The processor 130 may be configured to assign a weight for each path only under an intermediate curvature excluding a high curvature. On the other hand, when driving on a sharp curved road with a large curvature, a weight of the distance $C_2x^2$ due to the curvature increases in the target lateral movement distance, and thus the processor 130 does not assign a weight for each path component to prevent distortion of the path. In other words, the weight $W_1=1$ and the weight $W_0=1$.

Subsequently, the processor 130 may be configured to determine the assignment of the weights of the heading angle and the offset item depending on the vehicle offset. In particularly, the vehicle offset indicates a difference value between a current position of the vehicle and the target path (e.g., the center of the lane). The processor 130 may be configured to assign a weight when a current offsetPath $C_0$ of the vehicle is a region of Equation 3.

$$\text{Threshold2} < |\text{Path } C_0| < \text{Threshold1} \quad \text{Equation 3}$$

In other words, the processor 130 may be configured to assign different weights $W_1$, $W_0$ to the items of the heading angle $C_1$ and the offset $C_0$ when the offset |Path $C_0$| of the vehicle is in a region between a first threshold Threshold 1 and a second threshold Threshold 2. For example, $W_1$ may be assigned as an increasing value, and $W_0$ may be assigned as a decreasing value.

A region corresponding to Equation 3 is a section with the most tendency in which a direction of movement of the vehicle and a direction of the target lateral movement position are opposite, and indicates a section in which it is necessary to pre-reflect a line of steering wheel alignment depending on a time delay. In addition, the processor 130 may be configured to apply a weight range of 1 to 1.5 times for the heading angle $C_1$ and 0.5 to 1 times of a weight range for the offset $C_0$, and may design weights in a direction that minimizes path distortion.

On the other hand, the processor 130 does not assign a weight when the current offsetPath $C_0$ of the vehicle is a same region as in Equation 4.

|Path $C_0$|≥Threshold1

|Path $C_0$|≤Threshold1      Equation 4

Figure 2:
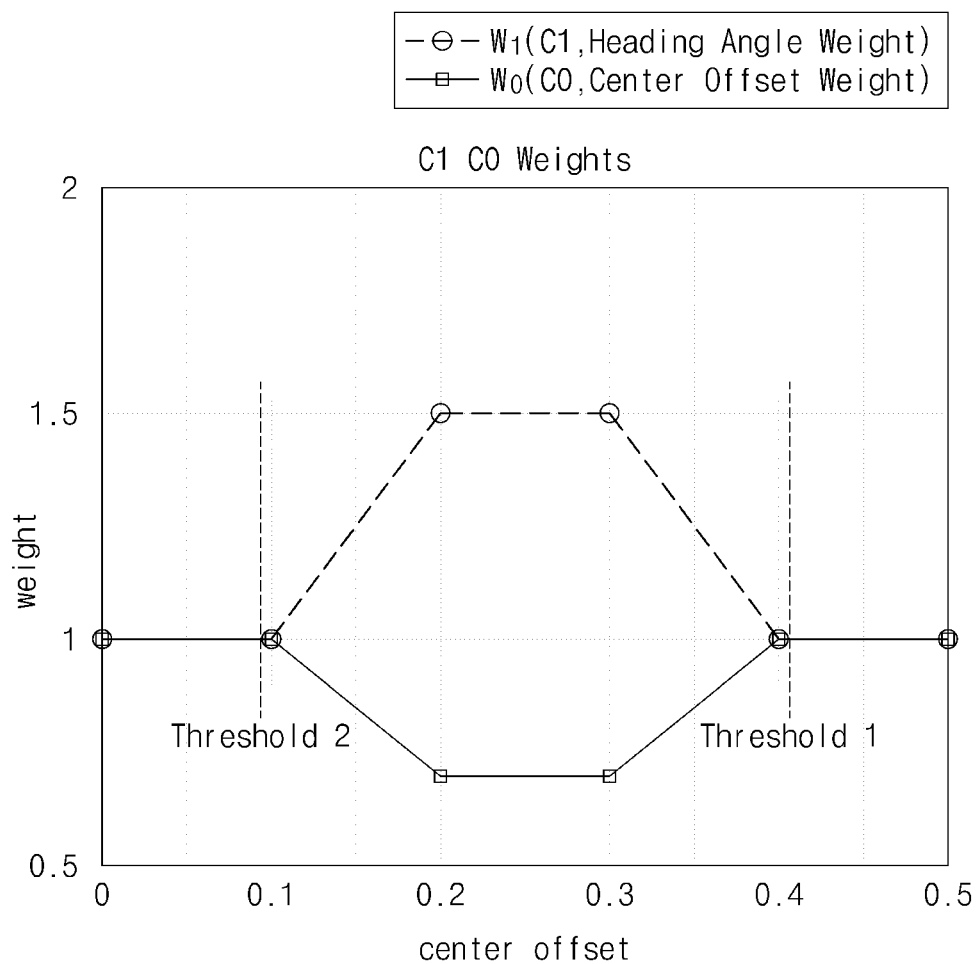
FIG. 2 illustrates a graph for describing weighting according to a center offset according to an exemplary embodiment of the present disclosure.

Referring to FIG. 2, a region below the second threshold (left region) is defined as an area in which the vehicle is positioned on the target path having a state where a steering wheel is aligned, and a weight for each path component is not assigned thereto. FIG. 2 illustrates a graph for describing weighting according to a center offset according to an exemplary embodiment of the present disclosure.

A region above the first threshold Threshold (right region) is a section where the vehicle offset is greatly deviated from the target path, a tendency of increasing an actual offset C0 to increase is reflected in calculation of the target lateral movement position, and a weight is not applied to eliminate path distortion.

The processor 130 may be configured to calculate a target lateral movement distance without applying a weight as shown in Equation 5.

$$y_{cam}=C_3x^3+C_2x^2+C_1x+C_0 \quad \text{Equation 5}$$

In particular, x indicates a gazing distance, $C_0$ indicates the offset, $C_1$ indicates the heading angle, $C_2$ indicates the curvature, and $C_3$ indicates a curvature change rate.

In other words, the processor 130 may be configured to calculate a target lateral movement distance $y_{cam}$ through a polynomial depending on parameters (offset, heading, curvature, curvature change rate) of each lane component and a gaze distance x. Accordingly, when a steering delay occurs, there may be a situation in which the vehicle does not reach the target point unlike the calculated target lateral movement distance $y_{cam}$.

Figure 3:
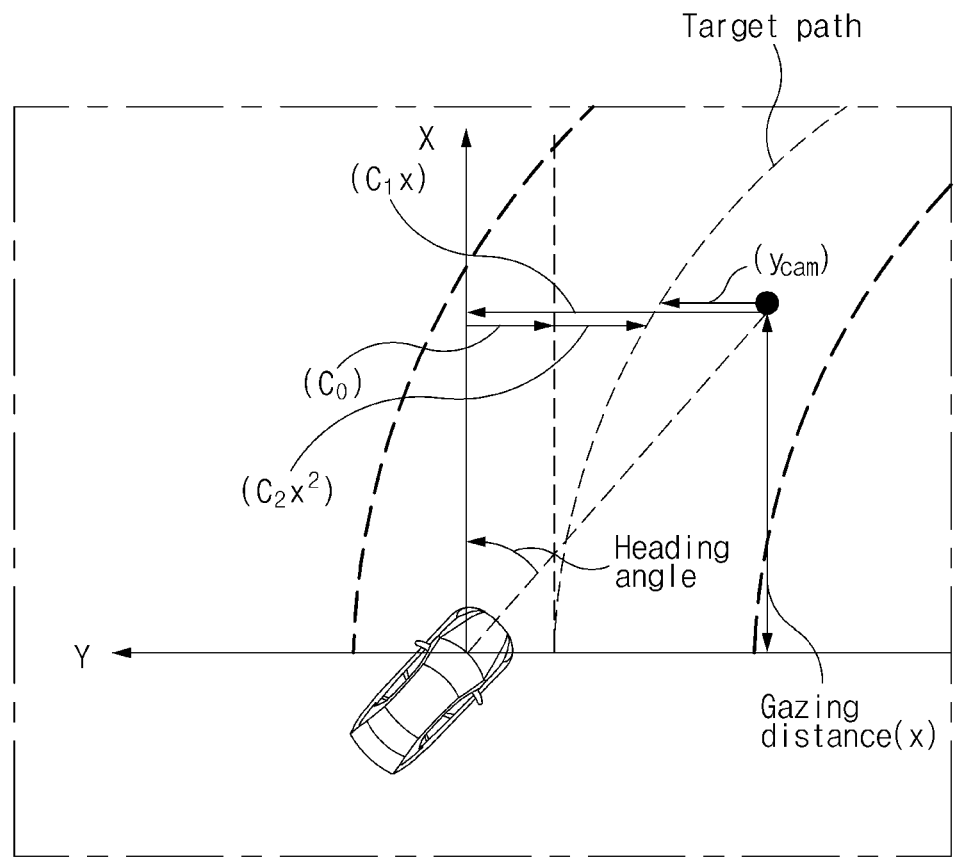
FIG. 3 illustrates a view for describing a process of calculating a target lateral movement distance when a weight is not applied by a lane keeping control apparatus according to an exemplary embodiment of the present disclosure.

In addition, since the steering wheel alignment is reflected late before reaching the target lateral movement position, a control overshoot may occur, causing an oscillation phenomenon in which the vehicle moves in a zig-zag direction between the left and right lanes. This oscillation phenomenon may mainly occur in commercial vehicles (buses or trucks) where an actual vehicle movement gap is large compared to a following value depending on the steering angle command. FIG. 3 illustrates a view for describing a process of calculating a target lateral movement distance when a weight is not applied by a lane keeping control apparatus according to an exemplary embodiment of the present disclosure.

Referring to FIG. 3, the final target lateral movement distance $y_{cam}$ is derived by summing all of a distance C1x by the heading angle, a distance C0 by the offset, and a distance $C_2x^2$ by curvature. In particular, a distance by a curvature change rate C3 may not be reflected because it is insufficient. A traveling direction of the distance C1x by the heading angle is an opposite direction to the distance C0 by the offset and the distance $C_2x^2$ by the curvature, when the distance by the heading angle $C_1x$, the distance by the offset $C_0$, and the distance by the curvature $C_2x^2$ are all summed up, a distance obtained by subtracting the distance by the offset $C_0$ and the distance by the curvature $C_2x^2$ from the distance by the heading angle $C_1x$ remains, and this remaining distance becomes the target lateral movement distance $y_{cam}$.

The processor 130 may be configured to calculate the target lateral movement distance by applying a weight for each path component as shown in Equation 6.

$$y_{w\_cam} = C_3x^3 + C_2x^2 + W_1C_1x + W_0C_0 \qquad \text{Equation 6}$$

Equation 6 represents an equation for calculating the target lateral movement distance $y_{w\_cam}$ to which the weight is applied by reflecting the weights $W_1$ and $W_0$ to the target lateral movement distance $y_{cam}$ of Equation 5 described above.

In other words, the processor 130 may be configured to pre-adjust the steering wheel alignment in a direction opposite to a current traveling direction of the vehicle in consideration of the steering delay, correct the heading angle and the offset such that a target steering angle can be reflected in the vehicle behavior, and reflect the corrected heading angle and offset to the target lateral movement distance $y_{cam}$.

Figure 4:
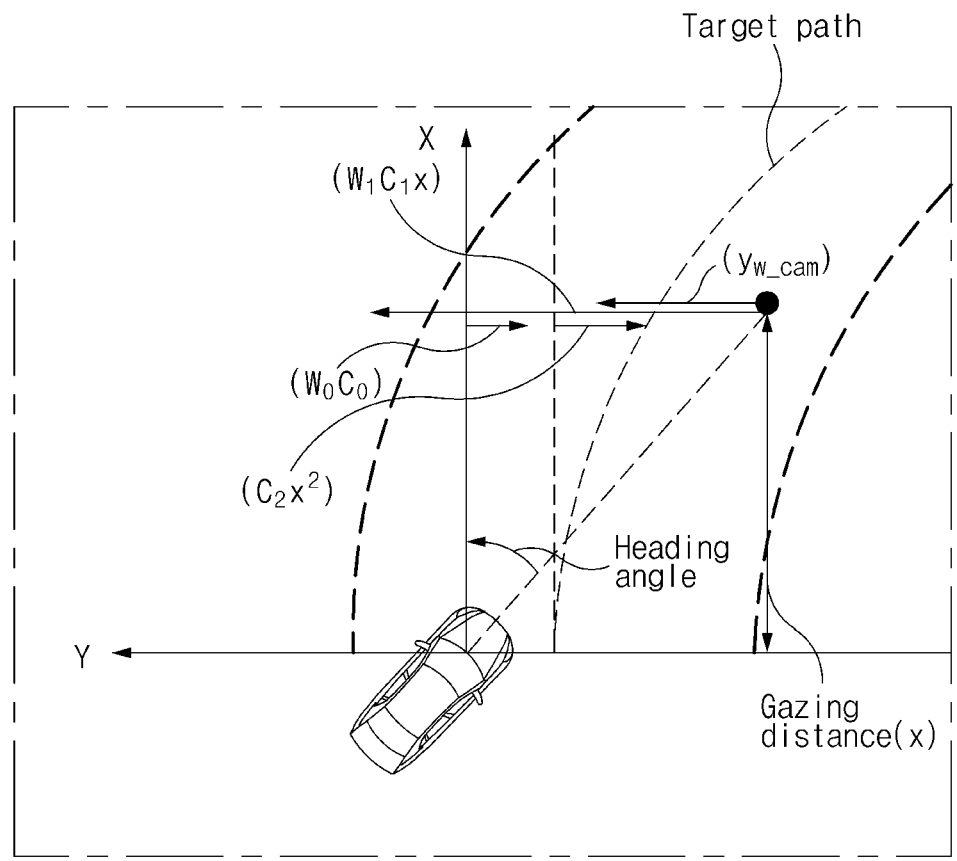
FIG. 4 illustrates a view for describing a process of calculating a target lateral movement distance when a weight is applied by a lane keeping control apparatus according to an exemplary embodiment of the present disclosure.

Particularly, the processor 130 may be configured to adjust a weight $W_1$ of the heading angle that may pre-reflect the handle alignment to be increased, and may adjust a weight $W_0$ of the offset that is reflected later by the steering delay and interferes with the steering wheel alignment, to be reduced. Accordingly, by imparting a damping effect, lane keeping control responsiveness may be improved. FIG. 4 illustrates a view for describing a process of calculating a target lateral movement distance when a weight is applied by a lane keeping control apparatus according to an exemplary embodiment of the present disclosure. Referring to FIG. 4, it can be seen that a distance $W_1C_1x$ by the weighted heading angle is longer than the distance $C_1x$ by the heading angle before correction. In addition, a distance $W_0C_0x$ by the weighted offset becomes shorter than the offset distance $C_0x$ before applying the weight, and eventually the final target lateral movement distance $y_{w\_cam}$ becomes longer.

In other words, the processor 130 may be configured to correct the heading angle and the offset to reflect the target steering angle in advance by pre-adjusting the steering wheel alignment in the direction opposite to the traveling direction of the vehicle, thereby adjusting the target lateral movement distance so that the vehicle stably follows the center of the lane. The sensing device 200 may include a camera 210 configured to acquire lane information, a steering angular velocity sensor 220 configured to detect a steering angular velocity of a vehicle, and the like. In particular, the camera 210 may be configured to photograph a front of the vehicle to obtain the lane information.

The steering control device 300 may be configured to adjust a steering angle of a vehicle, and may include a steering wheel, an actuator interlocked with the steering wheel, and a controller controlling the actuator. The braking control device 400 may be configured to adjust braking of the vehicle, and may include a controller configured to operate a brake thereof.

The engine control device 500 may be configured to adjust engine driving of a vehicle, and may include a controller configured to adjust a speed of the vehicle. Accordingly, the present disclosure improves vehicle responsiveness and path following performance by applying weights for a heading angle and offset items such that steering wheel is aligned in advance (opposite sign in the direction of progression) may be done in advance.

Figure 5:
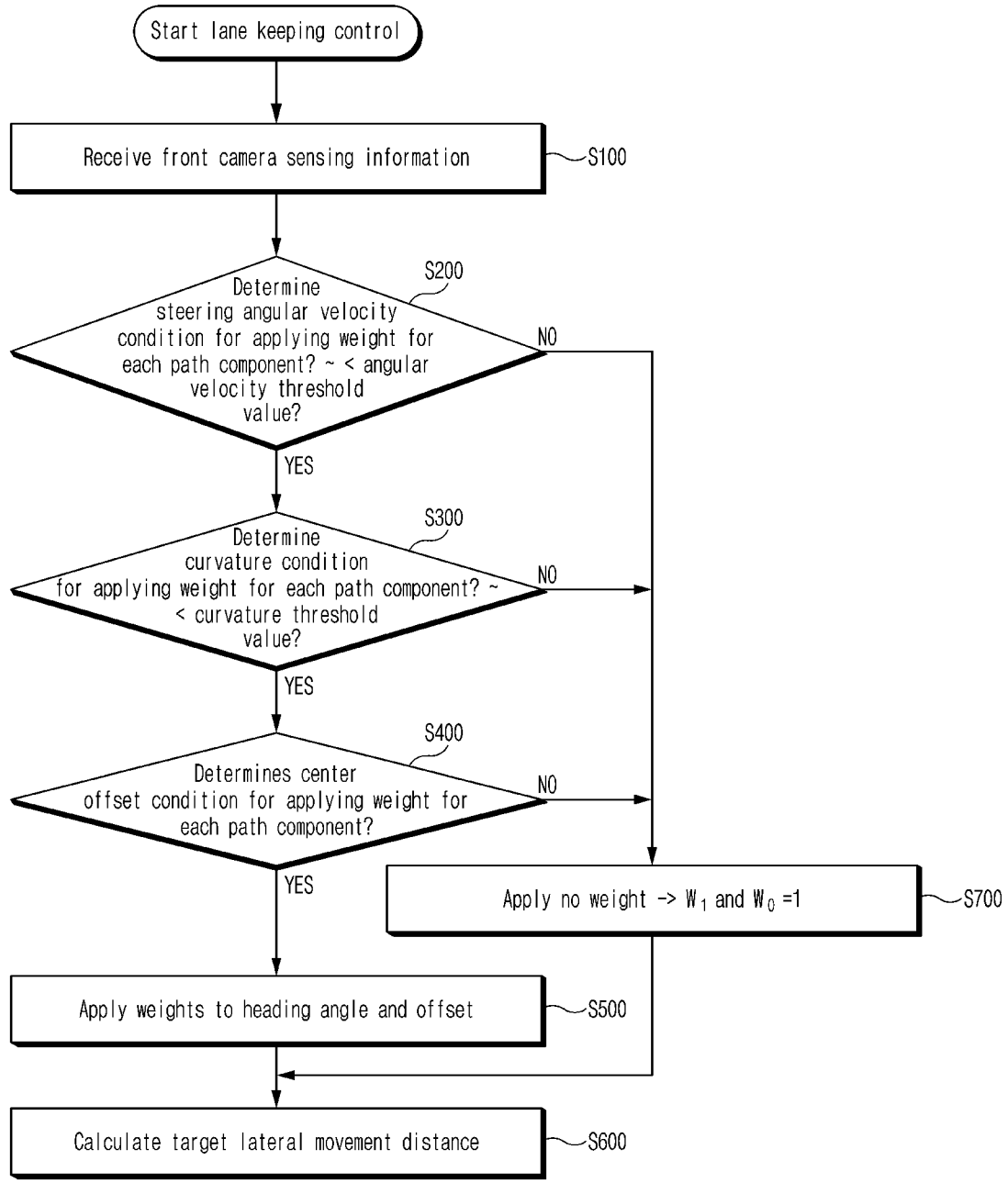
FIG. 5 illustrates a lane keeping control method according to an exemplary embodiment of the present disclosure.

Hereinafter, a lane keeping control method according to an exemplary embodiment of the present disclosure will be described in detail with reference to FIG. 5. FIG. 5 illustrates a lane keeping control method according to an exemplary embodiment of the present disclosure. Hereinafter, it is assumed that the lane keeping control apparatus 100 of the of FIG. 1 performs processes of FIG. 5. In addition, in the description of FIG. 5, operations described as being performed by a device may be understood as being controlled by the processor 130 of the lane keeping control apparatus 100.

Referring to FIG. 5, the lane keeping control apparatus 100 may be configured to receive sensing information from the camera 210 (S100). In particular, the sensing information may include lane information, and as an example, the lane information may include a center offset, a heading angle of a vehicle, a curvature of a driving road, a curvature change rate of a driving road, and the like.

The lane keeping control apparatus 100 may be configured to determine a steering angular velocity condition for applying a weight for each path component (S200). In other words, the lane keeping control apparatus 100 may be configured to determine whether the steering angular velocity is less than a predetermined angular velocity threshold value, and when the steering angular velocity is less than the predetermined angular velocity threshold value, determine that a weight for each path component may be applied.

Subsequently, the lane keeping control apparatus 100 may be configured to determine a curvature condition for applying a weight for each path component (S300). In other words, the lane keeping control apparatus 100 may be configured to determine whether the curvature of the driving road is smaller than a predetermined curvature threshold value, and when the curvature of the driving road is less than a predetermined curvature threshold value, determine that a weight for each path component may be applied.

Subsequently, the lane keeping control apparatus 100 may be configured to determine a center offset condition for applying a weight for each path component (S400). In other words, the lane keeping control apparatus 100 may be configured to determine whether a center offset is greater than a second threshold 2 and less than a first threshold 1.

When all of the angular velocity condition, the curvature condition, and the center offset condition are satisfied in the above-described steps S200, S300, and S400, the lane keeping control apparatus 100 may be configured to apply a weight for each path component. In other words, the lane keeping control apparatus 100 may be configured to apply weights to the heading angle and the offset as in Equation 6 (S500), and calculate the target lateral movement distance (S600).

On the other hand, when at least one of the angular velocity condition, the curvature condition, and the center offset condition is unsatisfied in the above-described steps S200, S300, and S400, the lane keeping control apparatus 100 may be configured to calculate the target lateral movement distance (S600) by not applying the weight as in Equation 5 (S700).

In an autonomous driving technique of Level 2 or higher, lateral control technique for lane keeping is a key field in terms of driver's driving convenience and safety. In the case of a vehicle that has slow responsiveness of the vehicle steering and a large weight load, the vehicle may not converge to the center of the lane and oscillation may occur due to the cumulative decrease in responsiveness when following the center of the lane, while, in the present disclosure, it is possible to improve stability of a lane center following performance by assigning weights to a heading angle and an offset item such that a steer wheel is aligned in advance before reaching a target lateral movement position.

Accordingly, even vehicles such as buses and trucks with low responsiveness of the vehicle steering system and large weight loads have a damping effect in the center of the lane to prevent oscillation, and stable autonomous driving control is possible even on roads with large inclination angles and diversified curvature.

Figure 6:
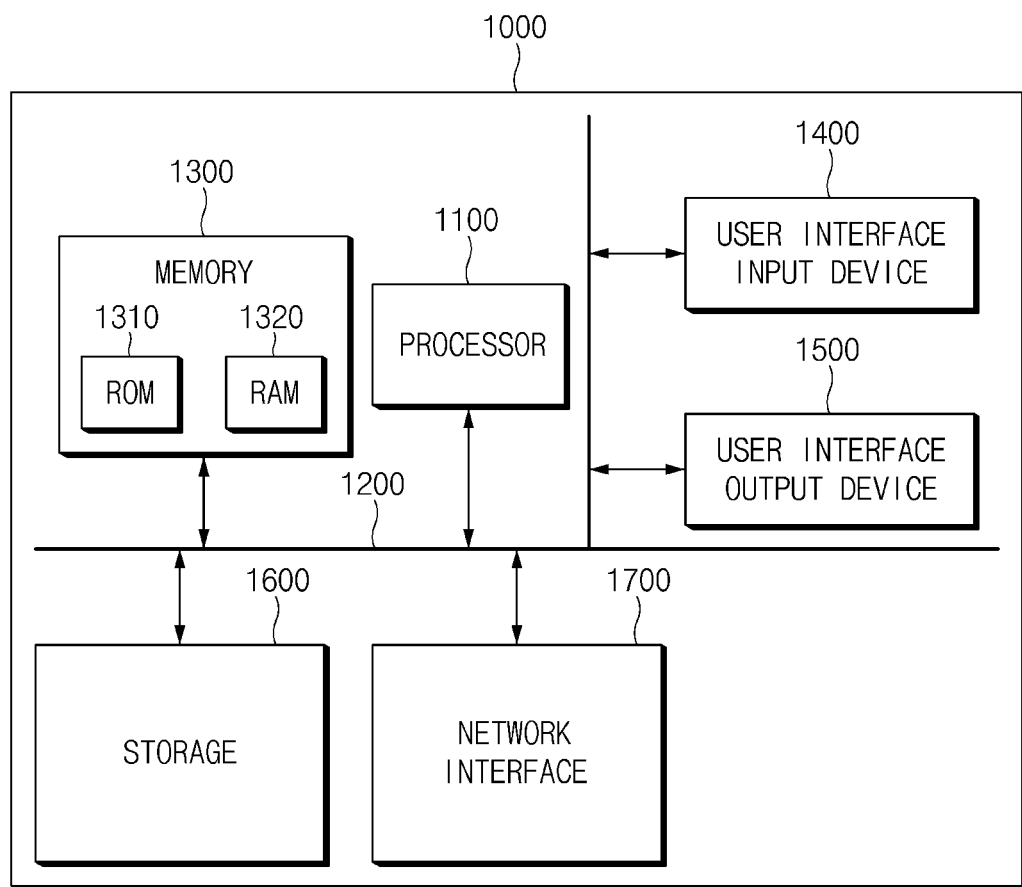
FIG. 6 illustrates a computing system according to an exemplary embodiment of the present disclosure.

FIG. 6 illustrates a computing system according to an exemplary embodiment of the present disclosure. Referring to FIG. 6, the computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A lane keeping control apparatus, comprising:
a processor configured to calculate a target lateral movement distance based on lane information during lane keeping control, and correct the target lateral movement distance by correcting a heading angle of a vehicle and an offset from a target path before the vehicle reaches the target path; and
a storage configured to store data and algorithms driven by the processor;
wherein the processor is further configured to assign different weights to the heading angle of the vehicle and the offset from the target path when the offset from the target path is less than a first predetermined threshold and greater than a second predetermined threshold that is less than the first threshold.

2. The lane keeping control apparatus of claim 1, wherein the processor is configured to:
calculate the target lateral movement distance based on a moving distance of the vehicle by the heading angle of the vehicle, a moving distance of the vehicle by the offset from the target path of the vehicle, and a moving distance of the vehicle by a curvature of a driving road.

3. The lane keeping control apparatus of claim 1, wherein the processor is configured to:
correct the target lateral movement distance when a steering angular velocity is less than a predetermined angular velocity threshold value and a curvature of a driving road is less than a predetermined curvature threshold value.

4. The lane keeping control apparatus of claim 3, wherein the processor is configured to:
correct the target lateral movement distance when the offset from the target path is less than the first predetermined threshold and greater than the second predetermined threshold.

5. The lane keeping control apparatus of claim 3, wherein the processor is configured to:
assign no weight to the heading angle of the vehicle and the offset from the target path when the offset from the target path is equal to or greater than the first predetermined threshold and equal to or less than the second predetermined threshold that is smaller than the first threshold.

6. The lane keeping control apparatus of claim 1, wherein the processor is configured to:
first reflect steering wheel alignment by adjusting the weight given to the heading angle of the vehicle to increase; and
reduce the weight assigned to the offset from the target path.

7. The lane keeping control apparatus of claim 1, wherein the processor is configured to:
assign a weight for increasing the heading angle of the vehicle and a weight for reducing the offset from the target path.

8. A vehicle system comprising:
a sensing device configured to acquire lane information related to a front of a vehicle; and
a lane keeping control apparatus configured to:
calculate a target lateral movement distance based on the lane information during lane keeping control;
correct the target lateral movement distance by correcting a heading angle of a vehicle and an offset from a target path before the vehicle reaches the target path; and
assign different weights to the heading angle of the vehicle and the offset from the target path when the offset from the target path is less than a first predetermined threshold and greater second predetermined threshold that is less than the first threshold.

9. The vehicle system of claim 8, wherein the lane keeping control apparatus is configured to:
calculate the target lateral movement distance based on a moving distance of the vehicle by the heading angle of the vehicle, a moving distance of the vehicle by the offset from the target path of the vehicle, and a moving distance of the vehicle by a curvature of a driving road.

10. The vehicle system of claim 8, wherein the lane keeping control apparatus is configured to:
   correct the target lateral movement distance when a steering angular velocity is less than a predetermined angular velocity threshold value and a curvature of a driving road is less than a predetermined curvature threshold value.

11. The vehicle system of claim 10, wherein the lane keeping control apparatus is configured to:
   correct the target lateral movement distance when the offset from the target path is less than the first predetermined threshold and greater than the second predetermined threshold.

12. The vehicle system of claim 8, wherein the lane keeping control apparatus is configured to:
   assign a weight for increasing the heading angle of the vehicle and a weight for reducing the offset from the target path.

13. A lane keeping control method, comprising:
   obtaining, by a controller, lane information during lane keeping control; and
   calculating, by the controller, a target lateral movement distance based on lane information; and
   correcting, by the controller, the target lateral movement distance by correcting a heading angle of a vehicle and an offset from a target path before the vehicle reaches the target path;
   wherein the correcting of the target lateral movement includes assigning, by the controller, different weights to the heading angle of the vehicle and the offset from the target path when the offset from the target path is less than a first predetermined threshold and greater than a second predetermined threshold that is less than the first threshold.

14. The lane keeping control method of claim 13, wherein the correcting of the target lateral movement distance includes calculating the target lateral movement distance based on a moving distance of the vehicle by the heading angle of the vehicle, a moving distance of the vehicle by the offset from the target path of the vehicle, and a moving distance of the vehicle by a curvature of a driving road.

15. The lane keeping control method of claim 13, wherein the correcting of the target lateral movement distance includes correcting the target lateral movement distance when a steering angular velocity is less than a predetermined angular velocity threshold value and a curvature of a driving road is less than a predetermined curvature threshold value.

16. The lane keeping control method of claim 13, wherein the correcting of the target lateral movement distance further includes:
   assigning, by the controller, no weight to the heading angle of the vehicle and the offset from the target path when the offset from the target path is equal to or greater than the first predetermined threshold and equal to or less than the second predetermined threshold.

17. The lane keeping control method of claim 16, wherein the correcting of the target lateral movement distance first reflecting steering wheel alignment by adjusting the weight given to the heading angle of the vehicle to increase; and reducing the weight assigned to the offset from the target path.

18. The lane keeping control method of claim 13, wherein the correcting of the target lateral movement distance includes assigning a weight for increasing the heading angle of the vehicle and a weight for reducing the offset from the target path.

* * * * *